United States Patent
Hirano et al.

(10) Patent No.: US 9,022,457 B2
(45) Date of Patent: May 5, 2015

(54) PROTECTIVE DEVICE FOR ONBOARD ELECTRICAL EQUIPMENT

(75) Inventors: Masahiro Hirano, Nagoya (JP); Ai Matsumoto, Anjou (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 14/003,707

(22) PCT Filed: Mar. 6, 2012

(86) PCT No.: PCT/IB2012/000412
§ 371 (c)(1),
(2), (4) Date: Sep. 6, 2013

(87) PCT Pub. No.: WO2012/120357
PCT Pub. Date: Sep. 13, 2012

(65) Prior Publication Data
US 2013/0341963 A1    Dec. 26, 2013

(30) Foreign Application Priority Data
Mar. 10, 2011 (JP) .................................. 2011-053466

(51) Int. Cl.
| | |
|---|---|
| *B60R 16/04* | (2006.01) |
| *B62D 25/08* | (2006.01) |
| *B62D 21/15* | (2006.01) |
| *B60L 3/00* | (2006.01) |
| *B60K 1/00* | (2006.01) |
| *B60L 11/18* | (2006.01) |
| *B60L 15/00* | (2006.01) |

(52) U.S. Cl.
CPC .............. *B60L 3/0007* (2013.01); *B60K 1/00* (2013.01); *B62D 21/15* (2013.01); *B60L 11/1812* (2013.01); *B60L 15/007* (2013.01); *Y02T 10/7088* (2013.01); *Y02T 10/7005* (2013.01); *Y02T 90/14* (2013.01); *Y02T 90/127* (2013.01)

(58) Field of Classification Search
USPC ............. 296/187.03, 187.09, 187.11, 187.12, 296/193.05, 193.08, 193.09, 296/203.01–203.04, 29, 187.01; 180/68.5
See application file for complete search history.

(56) References Cited

U.S. PATENT DOCUMENTS

| | | | |
|---|---|---|---|
| 7,066,515 B2 * | 6/2006 | Pierce et al. ..................... 296/21 |
| 7,510,036 B2 * | 3/2009 | Kikuchi et al. ............. 180/65.1 |
| 7,568,755 B2 * | 8/2009 | Imada et al. ............ 296/187.11 |
| 7,641,012 B2 * | 1/2010 | Burns .......................... 180/68.5 |

(Continued)

FOREIGN PATENT DOCUMENTS

| | | |
|---|---|---|
| JP | 2001-097052 A | 4/2001 |
| JP | 2005-262894 A | 9/2005 |

(Continued)

*Primary Examiner* — Gregory Blankenship
(74) *Attorney, Agent, or Firm* — Kenyon & Kenyon LLP (57) ABSTRACT

A protective device for an onboard electronic equipment includes a vehicle body reinforcing member that is arranged around the electronic equipment, and of which each end is fastened to an onboard fixed member, and in which force required to unfasten one end is less than force required to unfasten the other end, and a protective member that is mounted to a facing surface of the electronic equipment that faces the vehicle body reinforcing member such that, when the electronic equipment moves to the vehicle body reinforcing member side due to receiving force from a side of a vehicle body, the protective member will contact the vehicle body reinforcing member before the electronic equipment does.

9 Claims, 10 Drawing Sheets

(56) References Cited

U.S. PATENT DOCUMENTS

| | | | |
|---|---|---|---|
| 8,128,160 B2 * | 3/2012 | Leanza et al. | 296/203.02 |
| 8,646,830 B2 * | 2/2014 | Hettinger et al. | 296/187.12 |
| 8,657,350 B2 * | 2/2014 | Cabo | 293/102 |
| 8,657,365 B2 * | 2/2014 | Amano et al. | 296/187.11 |
| 8,708,401 B2 * | 4/2014 | Lee et al. | 296/187.03 |
| 8,720,976 B2 * | 5/2014 | Oyama et al. | 296/187.09 |
| 8,739,910 B2 * | 6/2014 | Katayama et al. | 180/68.5 |
| 2005/0205316 A1 | 9/2005 | Yamafuji | |
| 2006/0076800 A1 * | 4/2006 | Pierce et al. | 296/187.11 |
| 2006/0211287 A1 | 9/2006 | Kikuchi et al. | |
| 2009/0085374 A1 * | 4/2009 | Takei | 296/187.09 |
| 2010/0289295 A1 * | 11/2010 | Yoda et al. | 296/187.03 |
| 2011/0210579 A1 * | 9/2011 | Marur et al. | 296/187.03 |
| 2011/0210580 A1 * | 9/2011 | Sogabe | 296/187.09 |
| 2013/0015681 A1 * | 1/2013 | Hoshino | 296/187.03 |
| 2013/0169003 A1 * | 7/2013 | Kubo et al. | 296/187.09 |
| 2013/0200654 A1 * | 8/2013 | Ogawa et al. | 296/187.11 |
| 2013/0270862 A1 * | 10/2013 | Hotta et al. | 296/187.09 |
| 2013/0341963 A1 * | 12/2013 | Hirano et al. | 296/187.03 |
| 2014/0070566 A1 * | 3/2014 | Ogawa et al. | 296/187.11 |
| 2014/0084627 A1 * | 3/2014 | Yamanaka et al. | 296/187.09 |
| 2014/0097641 A1 * | 4/2014 | Hayano | 296/187.09 |

FOREIGN PATENT DOCUMENTS

| | | |
|---|---|---|
| JP | 2006-262673 A | 9/2006 |
| JP | 2007-290479 A | 11/2007 |
| JP | 4269848 B2 | 5/2009 |
| JP | 2009-154757 A | 7/2009 |

* cited by examiner

PROTECTIVE DEVICE FOR ONBOARD ELECTRICAL EQUIPMENT

CROSS REFERENCE TO RELATED APPLICATIONS

This is a national phase application based on the PCT International Patent Application No. PCT/IB2012/000412 filed on Mar. 6, 2012, which claims foreign priority to Japanese Patent Application No. 2011-053466 filed on Mar. 10, 2011, the entire contents of which are incorporated herein by reference.

BACKGROUND OF THE INVENTION

1. Field of the Invention

The invention relates to a protective device for electronic equipment that is mounted in a vehicle and arranged around a vehicle body reinforcing member.

2. Description of Related Art

In recent years, various electrical equipment has come to be mounted in vehicles. A large number of technologies to protect such electrical equipment, even when tremendous force is applied to the vehicle due to a vehicle collision, have been proposed. For example, Japanese Patent Application Publication No. 2001-097052 (JP 2001-097052 A) describes technology in which an inverter is arranged so as to rotate while being guided by a suspension tower, when the inverter abuts against the suspension tower due to a collision, in order to minimize the impact transmission toward the rear and prevent harnesses from breaking Also, Japanese Patent Application Publication No. 2006-262673 (JP 2006-262673 A), Japanese Patent Application Publication No. 2009-154757 (JP 2009-154757 A), Japanese Patent Application Publication No. 2005-262894 (JP 2005-262894 A), Japanese Patent Application Publication No. 2007-290479 (JP 2007-290479 A), and Japanese Patent No. 4269848 also describe technology for protecting onboard parts and the like when a vehicle collision occurs.

However, many of these technologies mainly presume a case in which the front of a vehicle collides with an object. A case in which the side of a vehicle collides with a pole or the like, such that force is received from the side of the vehicle has not been given sufficient consideration.

For example, in a hybrid vehicle, onboard electronic equipment such as an inverter may be mounted in an engine compartment or the like. Also, inside the engine compartment, vehicle body reinforcing members and members for reinforcing the rigidity of the vehicle body may be arranged to the inside of the electronic equipment. In this situation, if the side of the vehicle collides with a pole or the like such that the vehicle receives force from the side, the electrical equipment moves and collides with a vehicle body reinforcing member. In this case, vehicle body reinforcing members are usually extremely rigid, so the impact of the collision is unable to be absorbed and as a result, the wall surface of the electrical equipment collides with the vehicle body reinforcing member may become damaged.

SUMMARY OF THE INVENTION

The invention thus provides a protective device capable of reducing the possibility of damage to onboard electronic equipment resulting from a collision between the onboard electronic equipment and a vehicle body reinforcing member, when a collision from the side occurs.

An aspect of the invention relates to a protective device for onboard electronic equipment. The protective device includes a vehicle body reinforcing member that is arranged around the electronic equipment, and of which each end is fastened to an onboard fixed member, and in which force required to unfasten one end is less than force required to unfasten the other end; and a protective member that is mounted to a facing surface of the electronic equipment that faces the vehicle body reinforcing member such that, when the electronic equipment moves to the vehicle body reinforcing member side due to receiving force from a side of a vehicle body, the protective member will contact the vehicle body reinforcing member before the electronic equipment does.

In the protective device, the protective member may include a guide portion that guides a direction of movement of the vehicle body reinforcing member that is contacted by the protective member as a result of the protective member receiving force from the side of the vehicle body.

In the protective device, the guide portion may be a depressed portion that is provided in a position where the guide portion will contact the vehicle body reinforcing member, and that guides the vehicle body reinforcing member of which the one end has been unfastened from the fixed member following contact with the protective member, such that the vehicle body reinforcing member pivots about the other end. In this case, the protective device may also include a stopper that limits an amount of pivot of the vehicle body reinforcing member about the other end, by abutting against the vehicle body reinforcing member that pivots about the other end.

In the protective device, the guide portion may be an inclined surface that is provided in a position where the guide portion will contact the vehicle body reinforcing member, and that guides the vehicle body reinforcing member such that the one end that has been unfastened from the fixed member following contact with the protective member moves upward along the inclined surface.

In the protective device, the one end of the vehicle body reinforcing member may have a cutaway that is open on the electronic equipment side of the one end, and the one end of the vehicle body reinforcing member may be fastened to the fixed member by a fastening screw inserted into the cutaway.

In the protective device, the protective member may be such that a portion of the protective member contacts the facing surface of the electronic equipment, and another portion of the protective member is mounted to the electronic equipment at a position away from the facing surface. In the protective device, the portion of the protective member may have a flat shape that is parallel to the facing surface. In the protective device, the vehicle body reinforcing member may be a stabilizing brace by which a suspension tower and a dash panel are connected together inside of an engine compartment.

According to the protective device of an aspect of the invention, one end of the vehicle body reinforcing member is able to be unfastened even by a relatively small force, and thus is able to move so that there is a place for the electronic equipment to go. As a result, the possibility of damage to onboard electronic equipment resulting from a collision between the onboard electronic equipment and the vehicle body reinforcing member is able to be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
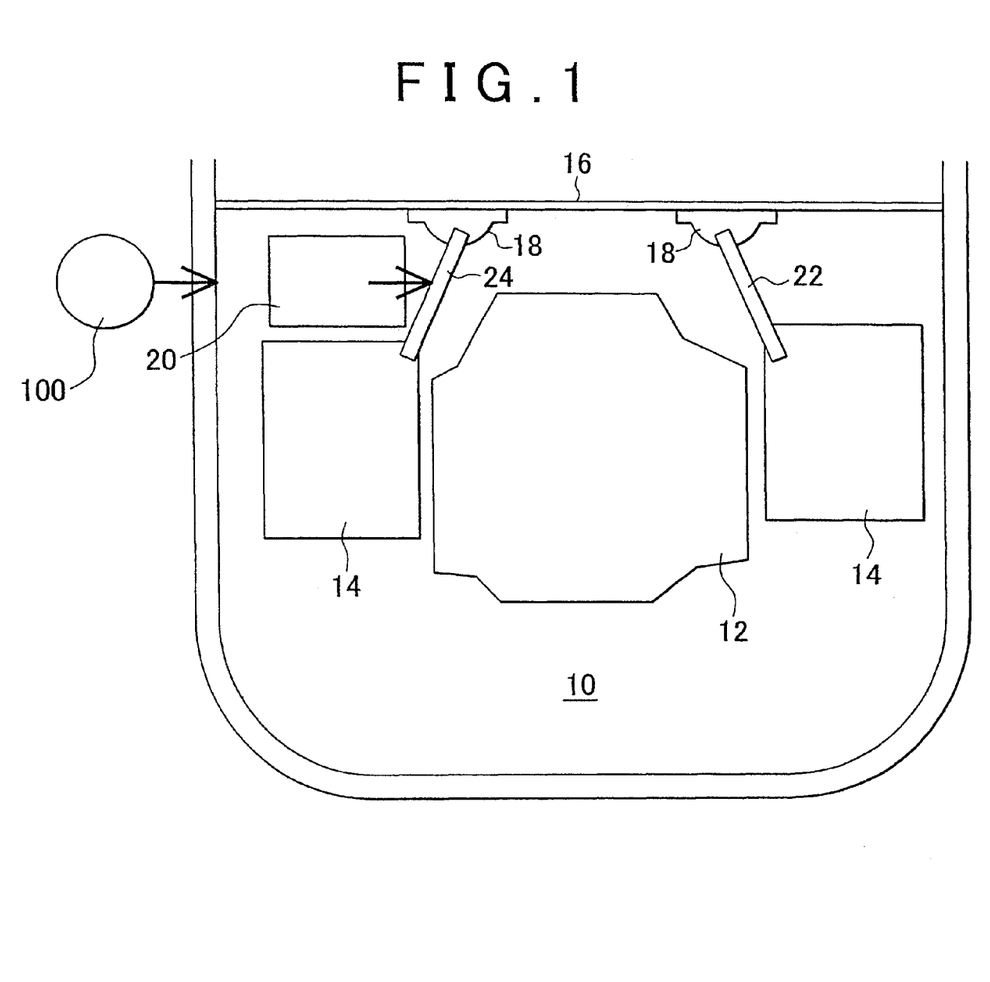
FIG. 1 is a schematic view of the internal structure of an engine compartment.

Hereinafter, example embodiments of the invention will be described with reference to the drawings. FIG. 1 is a schematic view of the internal structure of an engine compartment 10 of a front-wheel drive hybrid vehicle. An engine 12 that is one power source of the vehicle is arranged in substantially the center of this engine compartment 10. A suspension tower 14 that supports an upper portion of a suspension system is arranged on both sides of the engine 12. A stabilizing brace 22 and 24 is mounted to one corner of each suspension tower 14. The stabilizing braces 22 and 24 are vehicle body reinforcing members that are mounted to reinforce the rigidity of the vehicle body, and more specifically, to improve the torsional rigidity of the engine compartment 10. These stabilizing braces 22 and 24 are rod-shaped members that are made of comparatively highly rigid material, such as steel, for example. One end of each stabilizing brace 22 and 24 is bolted to one corner of the corresponding suspension tower 14, and the other end of each stabilizing brace 22 and 24 is bolted to a corresponding base 18 that is connected to a dash panel 16.

An inverter 20 is arranged between one of the suspension towers 14 and the dash panel 16, in a position to the vehicle outside of the stabilizing brace 24. This inverter 20 is electronic equipment that outputs a drive signal to a motor that is another power source of the vehicle, and is connected to a high voltage battery via a high voltage wire.

Here, this inverter 20 is surrounded by structures such as a fender, the suspension tower 14, the dash panel 16, and the engine 12. When the vehicle is involved in a frontal collision, the force of impact is absorbed by a side member. Therefore, when the vehicle is involved in a frontal collision, the inverter 20 does not receive a large impact load, and thus is not easily damaged.

On the other hand, when the side of the vehicle collides with a collided object 100 such as a pole, the impact load from the side may be unable to be totally absorbed by the fender, so that impact force may be received by the inverter 20 as well. In this case, the inverter 20 is pushed toward the vehicle inside and collides with (i.e., strikes) the stabilizing brace 24 that connects the suspension tower 14 to the dash panel 16, and then continues on to collide with the engine 12. The stabilizing brace 24 and the engine 12 are very rigid compared to the inverter 20. Therefore, the wall surface of the inverter 20 may become damaged by the collision with these highly rigid members. In particular, the stabilizing brace 24 that is provided facing the inverter 20 is a member for improving rigidity, and is therefore extremely rigid. Thus, when a side collision occurs, the stabilizing brace 24 does not break, but instead remains, and thus does not give the inverter 20 anywhere to go. As a result, the inverter 20 is sandwiched between the advancing collided object 100 and the highly rigid stabilizing brace 24, and ends up receiving the impact load.

In this example embodiment, a protective member 30 is provided on a side surface of the inverter 20 and the structure of the stabilizing brace 24 is special, in order to minimize damage to the electronic equipment (i.e., the inverter 20) following the side collision. This will now be described with reference to FIGS. 2 to 4.

Figure 2:
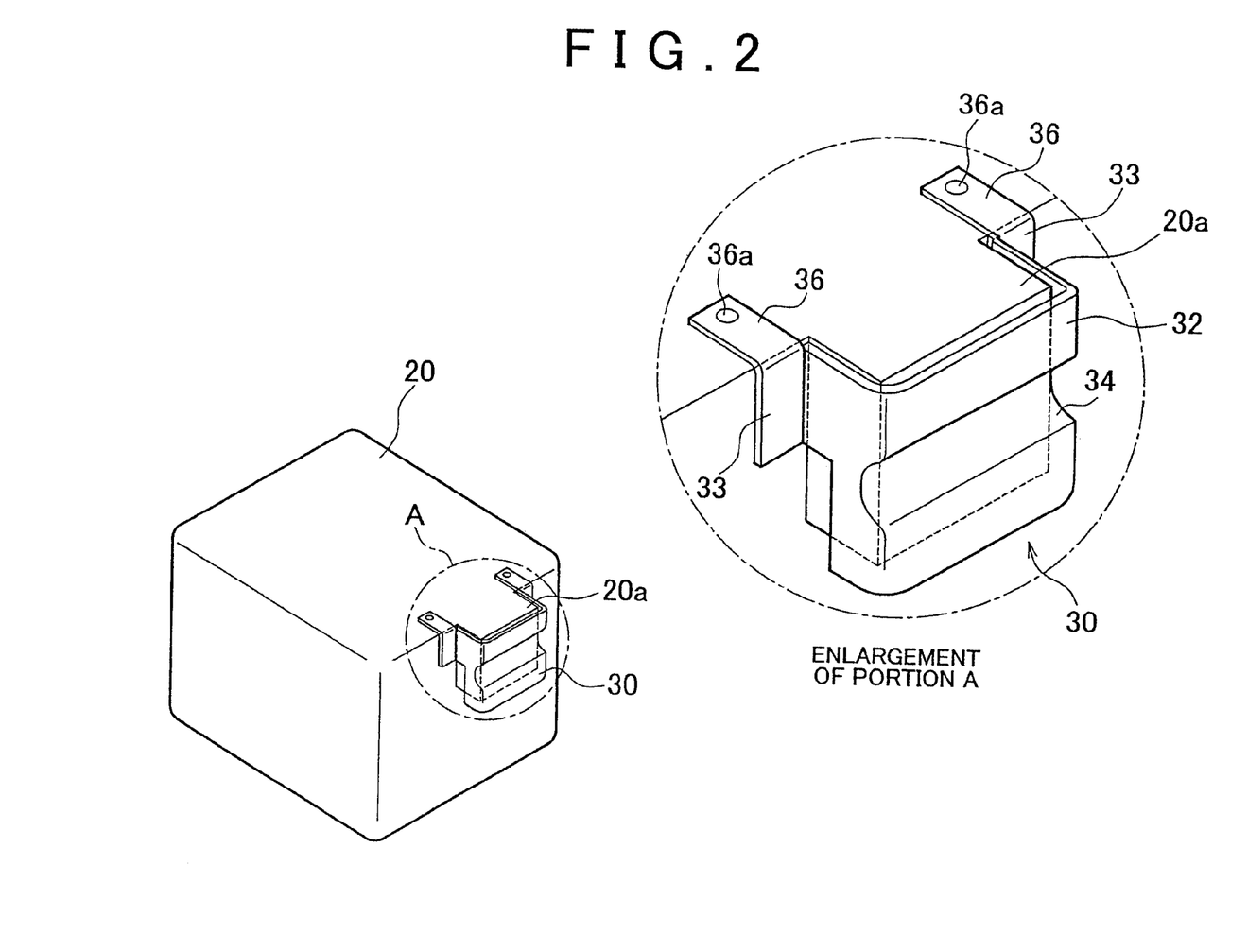
FIG. 2 is a perspective view schematically showing an inverter to which a protective member according a first example embodiment of the invention has been mounted.
Figure 3:
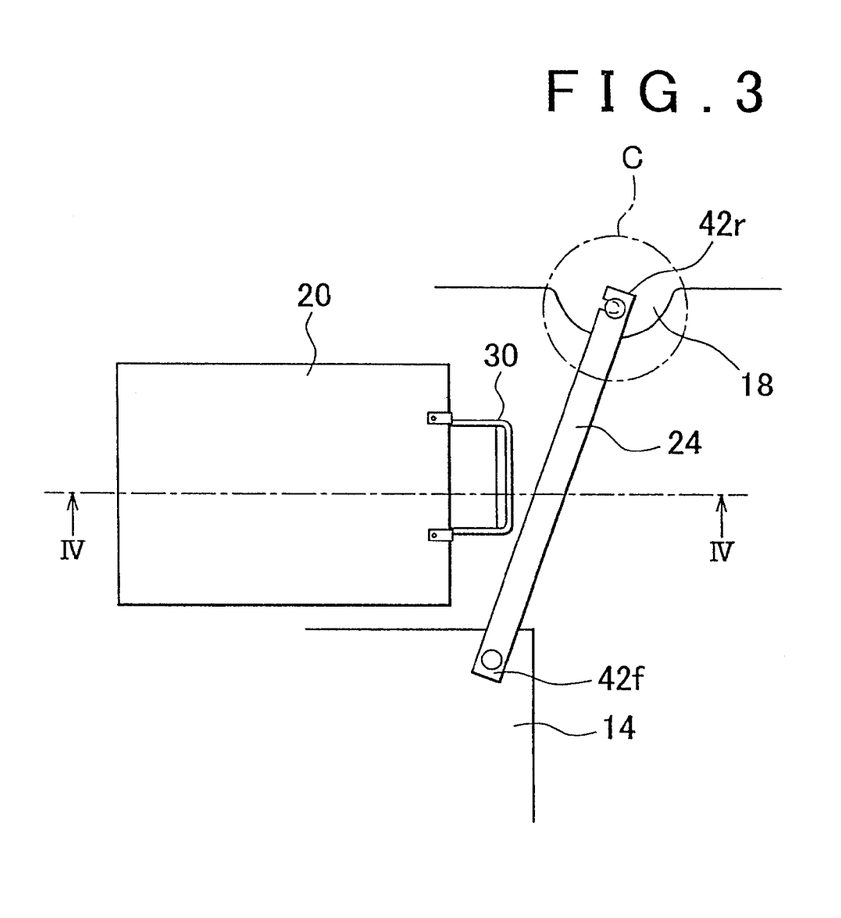
FIG. 3 is a plan view schematically showing the area around the inverter.
Figure 4:
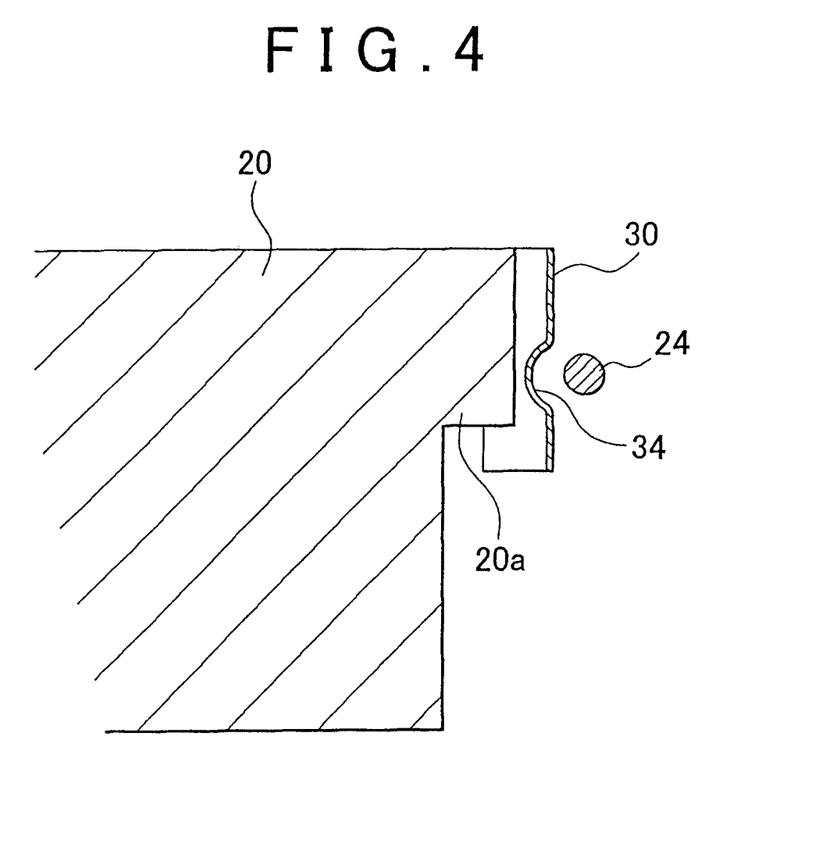
FIG. 4 is a schematic sectional view taken along line IV-IV in FIG. 3.

FIG. 2 is a perspective view schematically showing the inverter 20 to which the protective member 30 according a first example embodiment of the invention has been mounted. FIG. 3 is a plan view schematically showing the area around the inverter 20, and FIG. 4 is a schematic sectional view taken along line IV-IV in FIG. 3. The protective member 30 is a metal member that is mounted to a side surface of the inverter 20 that faces the stabilizing brace 24. A generally rectangular protruding portion 20a is provided on the surface of the inverter 20 of this example embodiment that faces the stabilizing brace 24. The protective member 30 is shaped so as to cover this protruding portion 20a. That is, the protective member 30 includes a main body portion 32 in which a metal plate is bent in a general U-shape, an abutting portion 33 that is connected to both ends of the main body portion 32, and a fastening portion 36 that is connected to an upper end of the abutting portion 33. The main body portion 32 is shaped in a general U-shape to cover the protruding portion 20a, and a guide groove 34 (i.e., a depression) with a generally semicircular cross section that extends in the horizontal direction is formed on the front surface of the main body portion 32 (i.e., on the surface opposite the inverter 20). This guide groove 34 serves as a guide portion to guide the direction of movement of the stabilizing brace 24 when the protective member 30 receives force from the side and contacts the stabilizing brace 24. The diameter of the guide groove 34 is at least larger than the diameter of the stabilizing brace 24, so that when contact is made, the stabilizing brace 24 will catch in the guide groove 34. Also, as is evident from FIG. 4, this guide groove 34 is designed to be at substantially the same height as the stabilizing brace 24, so when the inverter 20 moves to the stabilizing brace 24 side due to a side collision, the stabilizing brace 24 will hit the guide groove 34. Also, as is evident from FIG. 4, there is a gap between the front surface of the main body portion 32 and the front surface of the protruding portion 20a, such that even when the protective member 30 receives force from colliding with the stabilizing brace 24, this force will not be immediately transmitted to the front surface of the protruding portion 20a.

The abutting portion 33 is a flat plate-shaped portion that is parallel to the side surface of the inverter 20 and is connected to both the left and right ends of the main body portion 32. This abutting portion 33 is a portion that abuts against the side surface of the inverter 20 when the protective member 30 is mounted to the inverter 20. When the protective member 30 collides with the stabilizing brace 24, some of the force received by the protective member 30 is dispersed and transmitted to the side surface of the inverter 20 by this abutting portion 33.

The fastening portion 36 is a flat plate-shaped portion that is parallel to the upper surface of the inverter 20 and is connected to the upper end of the abutting portion 33. A fastening hole 36a though which a fastening bolt, not shown, is inserted is formed in this fastening portion 36. The protective member 30 is fastened (i.e., bolted) to the inverter 20 by screwing the fastening bolt to the upper surface of the inverter 20 after it has been inserted into the fastening hole 36a.

Next in this example embodiment, the structure of the stabilizing brace 24 that is arranged near the inverter 20 will be described. As described above, the stabilizing brace 24 is a rod-shaped member that is made of highly rigid material and provided to improve the rigidity of the vehicle body. One end 42f of the stabilizing brace 24 is bolted to the suspension tower 14 that serves as a fixed member, and the other end 42r of the stabilizing brace 24 is bolted to a base 18 that is connected to the dash panel 16 that also serves as a fixed member. A bolt inserting portion through which the fastening bolt is inserted is formed in each end 42f and 42r of the stabilizing brace 24. However, in this example embodiment, the configuration of the bolt inserting portion is different at one end than it is at the other end. More specifically, a round hole is formed as the bolt inserting portion in the front end portion 42f that is fastened to the suspension tower 14. The fastening bolt firmly engages with the front end portion 42f by the fastening bolt being inserted into this round hole. Thus, the fastening bolt is prevented from coming away from the front end portion 42f, and thus the front end portion 42f is prevented from coming away from the suspension tower 14. On the other hand, a cutaway 44 that is open on the inverter 20 side is formed as the bolt inserting portion in the rear end portion 42r that is fastened to the dash panel 16. The fastening bolt is screwed (i.e., fastened) to a seating surface of the dash panel 16 after being inserted into the cutaway 44. Here, the cutaway 44 in the rear end portion 42r into which the fastening bolt is inserted is open on the inverter 20 side. Therefore, there is no engagement relationship between the fastening bolt and the rear end portion 42r on the inverter 20 side. As a result, when force toward the inside of the vehicle is received, the rear end portion 42r relatively easily moves away from the fastening bolt and thus becomes unfastened from the dash panel 16.

That is, in this example embodiment, the unfastening force with respect to the fixed member is set low for only one of the two ends of the stabilizing brace 24. With this structure, when the inverter 20 is pushed into the stabilizing brace 24, the stabilizing brace 24 is allowed to move, thus creating a space for the inverter 20 to go.

Figure 5:
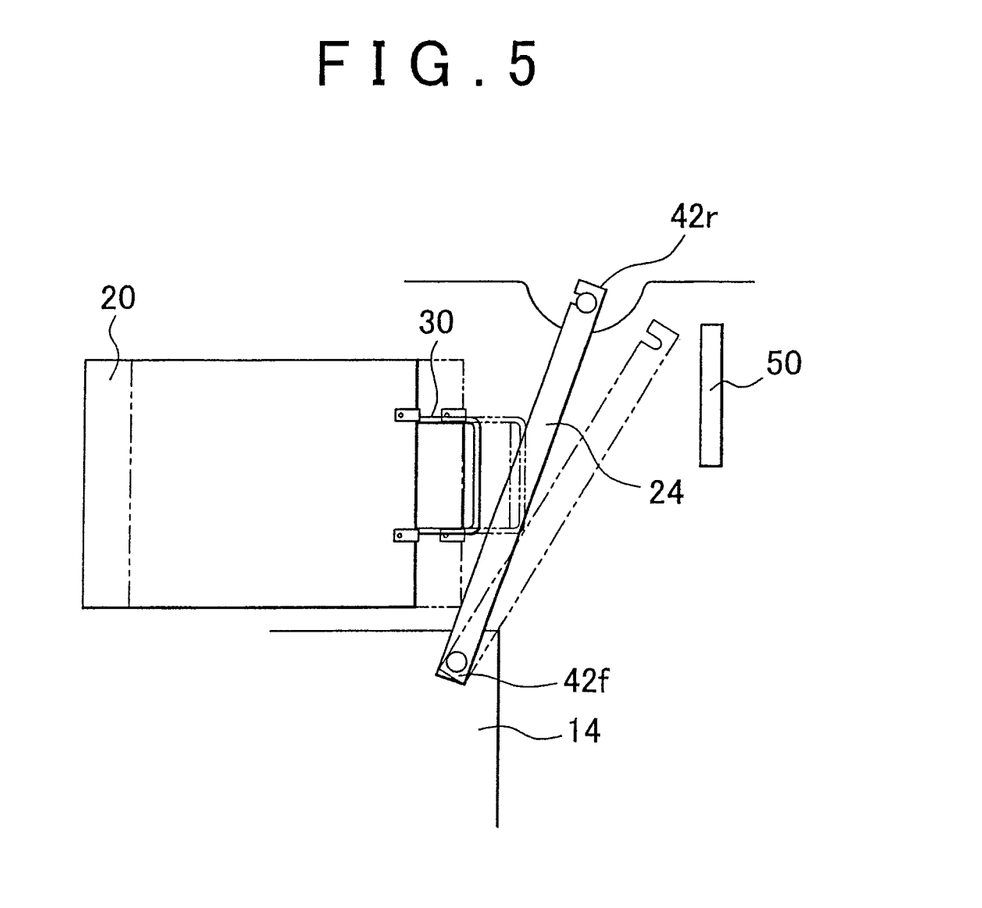
FIG. 5 is a view of a situation when the inverter is pushed toward the inside of the vehicle by a side collision.

Next, the operation of this example embodiment will be described with reference to FIG. 5. FIG. 5 is a view of a situation when the inverter 20 is pushed toward the inside of the vehicle (hereinafter simply referred to as the "vehicle inside") (i.e., the stabilizing brace 24 side) by a side collision. When the side of the vehicle collides with a collided object 100 such as a pole, the inverter 20 is pushed by the collided object 100 that has entered the vehicle, and moves toward the vehicle inside (i.e., to the right side in FIG. 5). However, the stabilizing brace 24 that connects the suspension tower 14 to the dash panel 16 is provided to the inside of the inverter 20, so when the inverter 20 moves to the vehicle inside from the side collision, the side surface of the inverter 20 will collide with the stabilizing brace 24.

In this example embodiment, the protective member 30 is provided on the side of the inverter 20 that faces the stabilizing brace 24. Therefore, when the inverter 20 moves to the vehicle inside (i.e., the stabilizing brace 24 side), the protective member 30 will first abut against the stabilizing brace 24 and be pushed into the stabilizing brace 24. Here, as described with reference to FIG. 4, the guide groove 34 provided on the front surface of the protective member 30 is at substantially the same height as the stabilizing brace 24, so the stabilizing brace 24 will abut against and catch in this guide groove 34. Also, the load (i.e., the reaction force received from the stabilizing brace 24) that the protective member 30 receives as a result of being pushed into the stabilizing brace 24 is transmitted to the side surface of the inverter 20 via the abutting portion 33. The abutting portion 33 surface-contacts the side surface of the inverter 20, so the load is also dispersed and transmitted to this entire contact surface. When the load is dispersed and transmitted in this way, an excessive load is consequently inhibited from being applied to a portion of the inverter 20, so damage to the inverter 20 is inhibited.

When the inverter 20 moves farther toward the vehicle inside, the stabilizing brace 24 receives a greater load from the protective member 30. When this load becomes equal to or greater than a certain load, the stabilizing brace 24 will become unfastened from the dash panel 16. That is, as described above, in this example embodiment, the fastening bolt is inserted into the cutaway 44 that is open on the inverter 20 side in the rear end portion 42r, and the engaging force thereof is small on the inverter 20 side. Therefore, when force in the vehicle inside direction is received, even if this force is relatively small, the rear end portion 42r will move away from the fastening bolt such that the rear end portion 42r becomes unfastened from the dash panel 16.

When the rear end portion 42r becomes unfastened from the dash panel 16, the rear end portion 42r consequently becomes a free end that is unrestrained, and thus moves when it receives the pushing force of the inverter 20. Here, at this time, the stabilizing brace 24 abuts against and catches in the guide groove 34 of the protective member 30. The stabilizing brace 24 that is caught in the guide groove 34 is inhibited from moving in the vertical direction by the guide groove 34, and is only allowed to move in the horizontal direction. Also, the rear end portion 42r is a free end that is unfastened, while the front end portion 42f is a fixed end that is fastened to the suspension tower 14 as before. Therefore, when the pushing force of the inverter 20 is received, the stabilizing brace 24 pivots in a horizontal plane about the front end portion 42f. Having the stabilizing brace 24 pivot in a horizontal plane in this way creates a place for the inverter 20 to go. When the inverter 20 is able to move away, the impact load from the collided object 100 on the inverter 20 can be reduced, thereby enabling damage to the inverter 20 to be effectively reduced.

In this example embodiment, having the stabilizing brace 24 pivot in a horizontal plane creates a place for the inverter 20 to go, thereby inhibiting damage to the inverter 20. However, in this case, the pivoted stabilizing brace 24 may in turn abut against another member (such as an oil supply pipe of the engine 12, for example), and possibly damage this other member as a result. Therefore, in order to inhibit the other member from being damaged, a stopper 50 that restricts the rear end portion 42r from pivoting any further by abutting against the rear end portion 42r of the stabilizing brace 24 that pivots may be provided near the other member.

Figure 6:
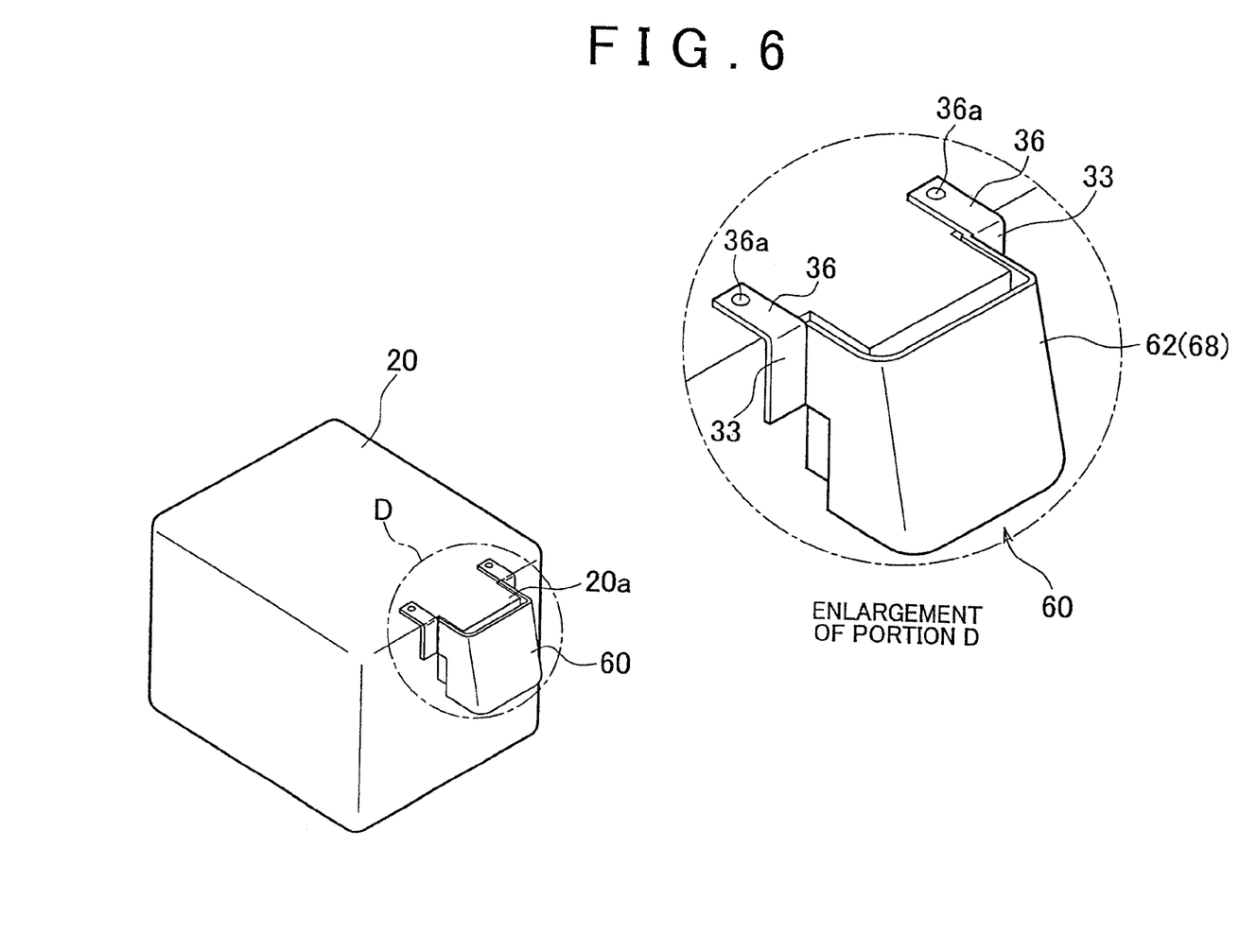
FIG. 6 is a perspective view schematically showing an inverter to which a protective member according to a second example embodiment of the invention has been mounted.
Figure 7:
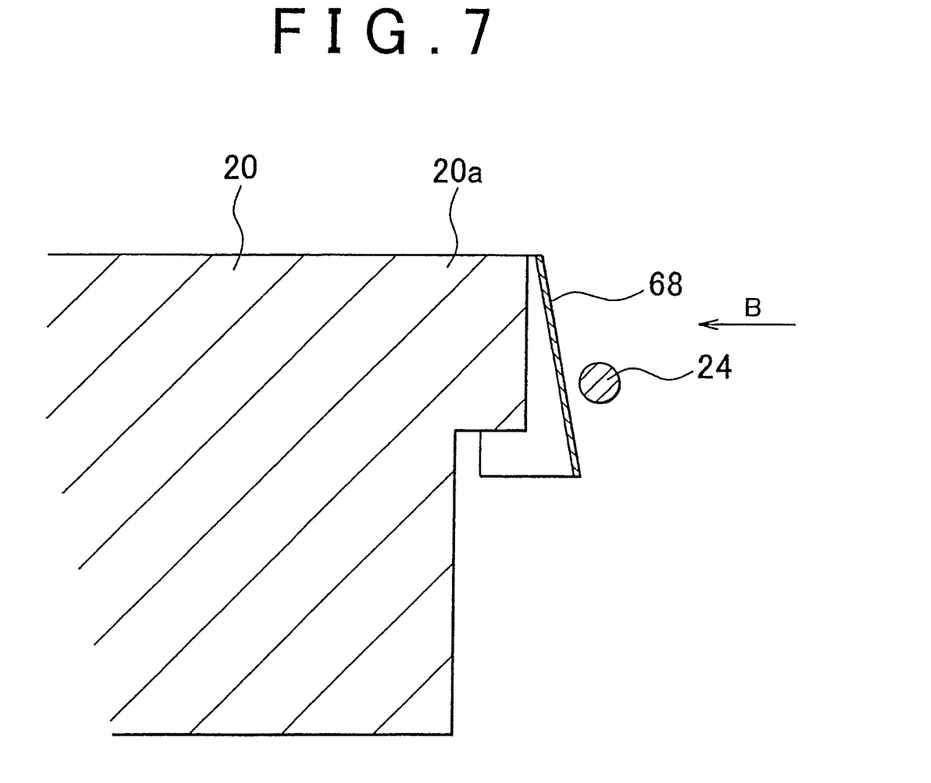
FIG. 7 is a schematic sectional view of the area around the inverter.
Figure 8:
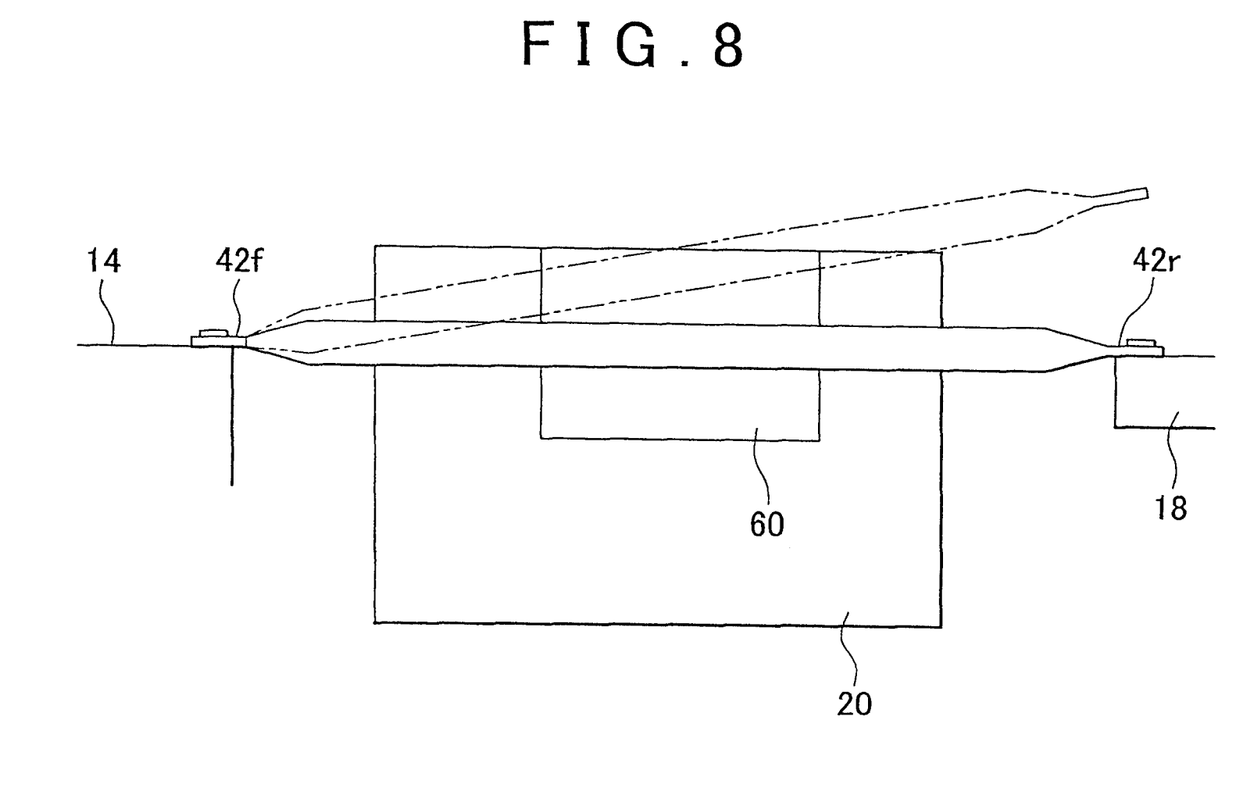
FIG. 8 is a view of a situation when the inverter is pushed toward the inside of the vehicle by a side collision.

Next, a second example embodiment of the invention will be described with reference to FIGS. 6 to 8. FIG. 6 is a perspective view schematically showing an inverter 20 to which a protective member 60 according to the second example embodiment has been mounted. FIG. 7 is a schematic sectional view of the area around the inverter 20, and FIG. 8 is a view of a situation when the inverter 20 is pushed toward the inside of the vehicle by a side collision, as viewed in the direction of arrow B in FIG. 7.

In the second example embodiment, the structure other than that of the protective member 60 is substantially the same as it is in the first example embodiment, so mainly the structure of the protective member 60 will be described. The protective member 60 in the second example embodiment includes a main body portion 62, an abutting portion 33, and a fastening portion 36, similar to the protective member 60 in the first example embodiment. The abutting portion 33 is a flat plate-shaped portion that is connected to both ends of the main body portion 62 and contacts the side surface of the inverter 20. This abutting portion 33 disperses the impact load from the stabilizing brace 24 and transmits it to the side surface of the inverter 20. The fastening portion 36 is a flat plate-shaped portion that is connected to the upper end of the abutting portion 33 and is screwed to the upper surface of the inverter 20.

The main body portion 62 is a metal member that is bent is a general U-shape. However, unlike the first example embodiment, the front surface of the main body portion 62 of this example embodiment (i.e., the surface opposite the inverter 20) is a tapered surface 68 that tapers away from the side surface of the inverter 20 farther down. The tapered surface 68 serves as a guide portion that guides the direction of movement of the stabilizing brace 24 with which the tapered surface 68 has collided.

As shown in FIG. 7, the tapered surface 68 is provided in a position where it is able to face the stabilizing brace 24. Also, there is a gap between the front surface of the main body portion 62 (i.e., the tapered surface 68) and the front surface of the protruding portion 20*a* of the inverter 20, such that even when the protective member 60 collides with the stabilizing brace 24 and consequently receives force, this force will not be immediately transmitted to the front surface of the protruding portion 20*a*.

The structure of the stabilizing brace 24 is substantially the same as it is in the first example embodiment. That is, the front end portion 42*f* of the stabilizing brace 24 is fastened to the suspension tower 14 by a fastening bolt that is inserted through a round hole formed in the front end portion 42*f*. Also, the rear end portion 42*r* of the stabilizing brace 24 is fastened to the dash panel 16 by a fastening bolt that is inserted into the cutaway 44 formed in the rear end portion 42*r*. Therefore, the unfastening force of the rear end portion 42*r* is smaller than the unfastening force of the front end portion 42*f* (i.e., it takes less force to unfasten the rear end portion 42*r* than it does to unfasten the front end portion 42*f*), so when force in the inside direction is received, the rear end portion 42*r* becomes unfastened first.

The operation of this second example embodiment will now be described with reference to FIG. 8. When the side of the vehicle collides with a collided object 100 such as a pole, the inverter 20 is pushed by the collided object 100 that has entered the vehicle, and moves toward the vehicle inside. However, the stabilizing brace 24 that connects the suspension tower 14 to the dash panel 16 is provided to the inside of the inverter 20, so when the inverter 20 moves to the vehicle inside from the side collision, the side surface of the inverter 20 will collide with the stabilizing brace 24.

In this example embodiment, the protective member 60 is provided on the side of the inverter 20 that faces the stabilizing brace 24. Therefore, when the inverter 20 moves to the vehicle inside (i.e., the stabilizing brace 24 side), the protective member 60 will first abut against the stabilizing brace 24 and be pushed into the stabilizing brace 24. The load (i.e., the reaction force received from the stabilizing brace 24) that the protective member 60 receives as a result of being pushed into the stabilizing brace 24 is dispersed and transmitted to the side surface of the inverter 20 via the abutting portion 33. As a result, an excessive load is inhibited from being applied to a portion of the inverter 20, so damage to the inverter 20 is inhibited.

When the inverter 20 moves farther toward the vehicle inside, the stabilizing brace 24 receives a greater load from the protective member 30. When this load becomes equal to or greater than a certain load, the stabilizing brace 24 will become unfastened from the dash panel 16. As a result of the stabilizing brace 24 unfastening from the dash panel 16, the rear end portion 42*r* that has become a free end moves when it receives the pushing force of the inverter 20.

Here, at this time, the stabilizing brace 24 abuts against the tapered surface 68 that is the front surface of the protective member 60. When the inverter 20 moves to the vehicle inside (i.e., the stabilizing brace 24 side), this tapered surface 68 pushes the stabilizing brace 24. The stabilizing brace 24 that is pushed by the tapered surface 68 is pushed up by the tapered surface 68, as shown in FIG. 8, and thus moves upward. However, the front end portion 42*f* is fastened to the suspension tower 14, so the stabilizing brace 24 will bend near the front end portion 42*f*, and the rear end portion 42*r* will move upward. Having the stabilizing brace 24 move upward in this way gives the inverter 20 a place to go, so the impact load that the inverter 20 receives from the collided object 100 can be reduced, thereby enabling damage to the inverter 20 to be effectively reduced. Also, in this example embodiment, the stabilizing brace 24 moves upward, so it is unlikely that the stabilizing brace 24 will interfere with another member, and as a result, damage to the other member is also able to be inhibited. The stabilizing brace 24 may also be bent at a slight angle near the front end portion 42*f* in advance in order to promote the upward movement of the stabilizing brace 24, and thus the bending of the stabilizing brace 24.

In any case, the impact force transmitted to the inverter 20 can be reduced, so damage to the inverter 20 can be effectively inhibited, by setting the unfastening force of one end of the stabilizing brace 24 low, and providing the protective member 30 or 60 that contacts the stabilizing brace 24, on the side surface of the inverter 20, as described in the first and second example embodiments. The structures described thus far are merely examples. Other structures may be modified as appropriate as long as a protective member that is mounted to a side surface of onboard electronic equipment, and a vehicle body reinforcing member of which one end is attached so as to be able to unfasten easily are provided.

Figure 9:
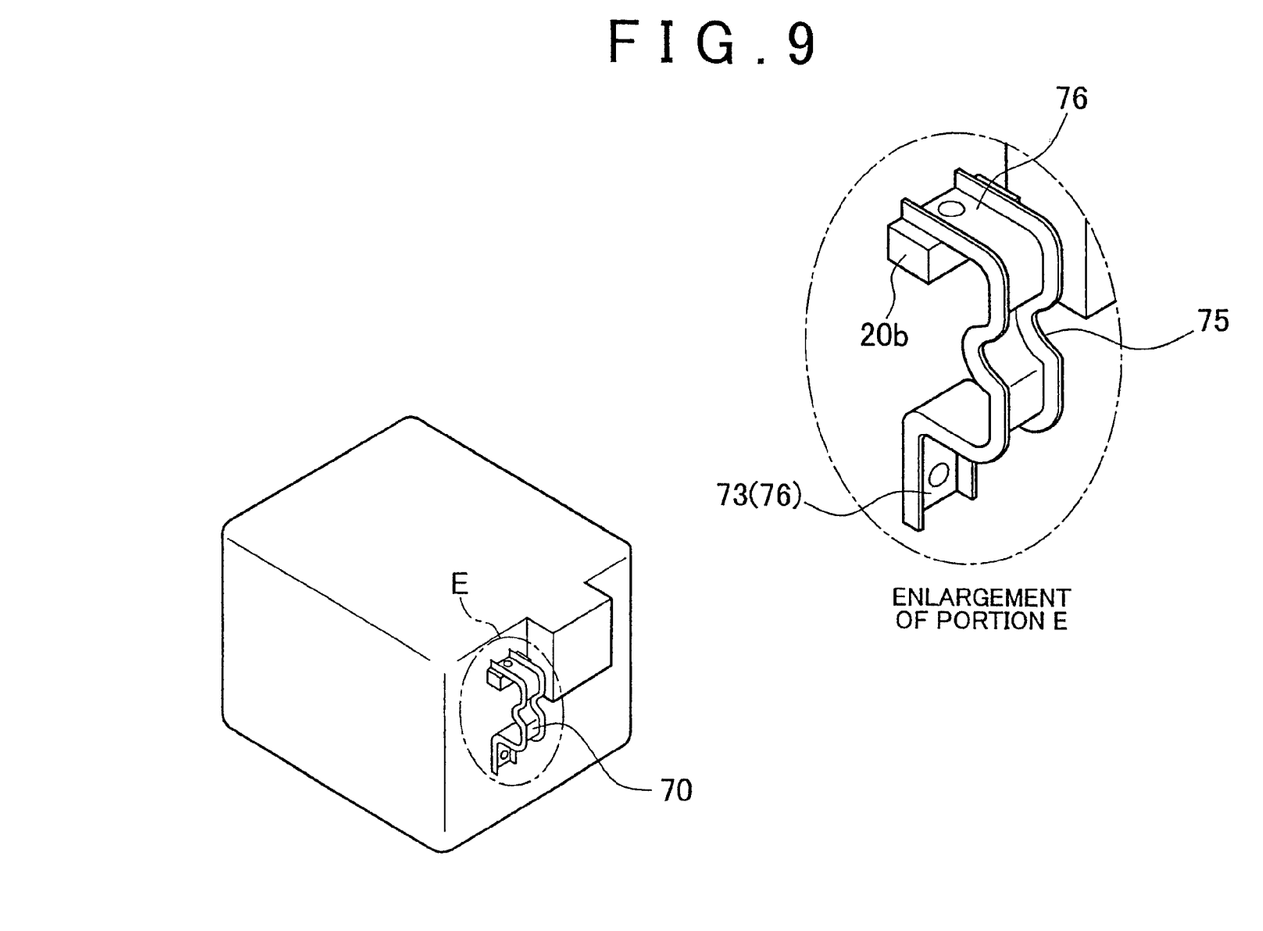
FIG. 9 is a perspective view schematically showing an inverter to which another protective member has been mounted.

For example, in the example embodiments described above, the protective members 30 and 60 are relatively wide structures, but they may also be narrow structures as long as they are able to contact the stabilizing brace 24 before the inverter 20 does when a side collision occurs. Also, the mounting position of the protective members 30 and 60 may be modified as appropriate according to the shape of the side surface of the inverter 20 and the shape of the protective members 30 and 60, as long as the protective members 30 and 60 are able to contact the stabilizing brace 24 before the inverter 20 does when a side collision occurs. Therefore, a protective member 70 such as that illustrated in FIG. 9, for example, may also be used. This protective member 70 is formed by bending a metal plate of narrow width that extends in the vertical direction, and both ends in the width direction form ribs that are folded toward the front (i.e., the side opposite the inverter 20). The lower end portion of this protective member 70 extends in the vertical direction and is mounted in a state contacting the side surface of the inverter 20. Therefore, this lower end portion serves as both an abutting portion 73 that distributes the load and transmits it to the side surface of the inverter 20, and as a fastening portion 76 that is fastened to the inverter 20. Also, a groove portion 75 that abuts against and catches the stabilizing brace 24 is formed in substantially the center of the protective member 70. This groove portion 75 serves as a guide portion that guides the direction of movement of the stabilizing brace 24 that is contacted by the groove portion 75 as a result of the groove portion 75 receiving force from the side.

Figure 10:
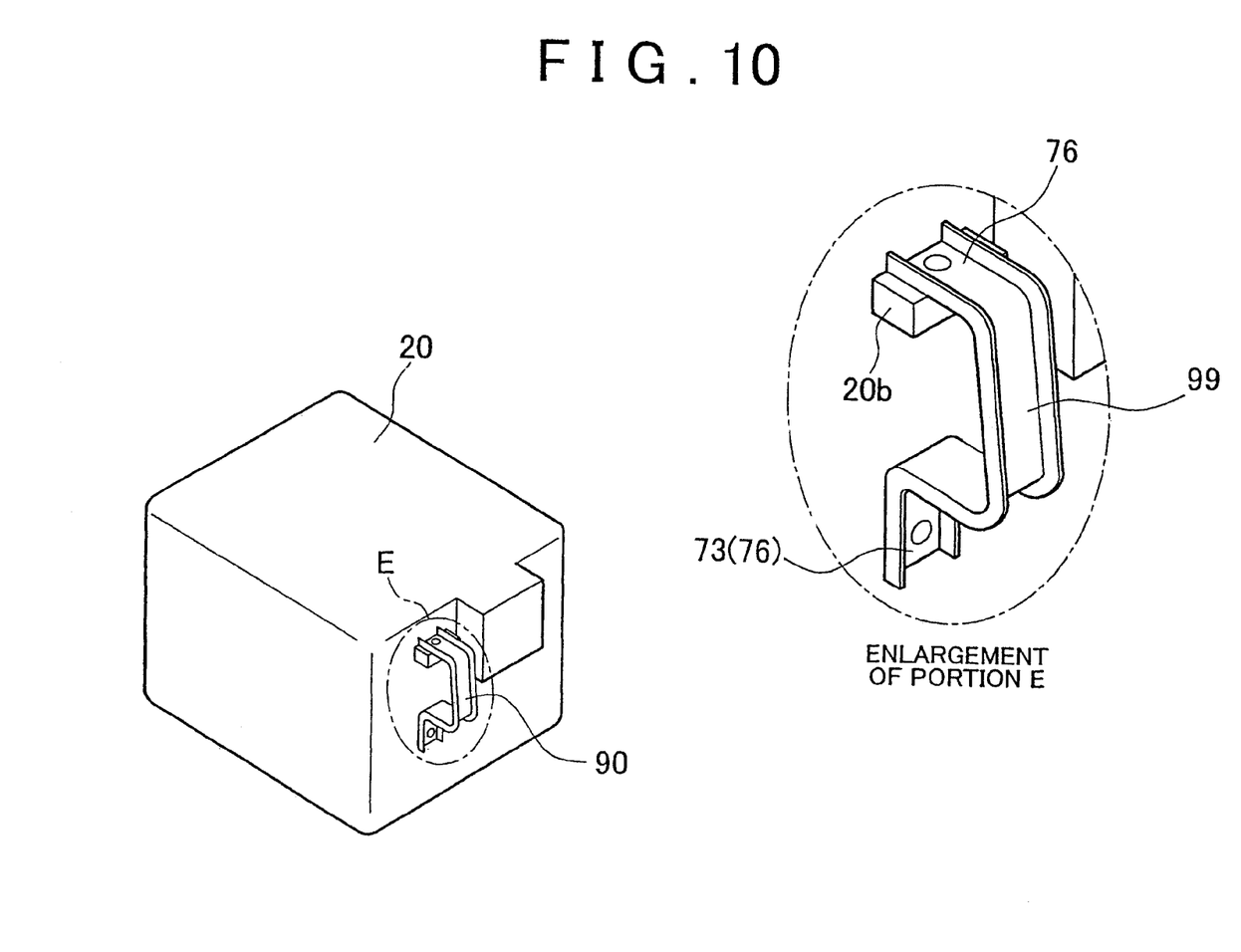
FIG. 10 is a perspective view schematically showing an inverter to which yet another protective member has been mounted.

Also, as another mode, a protective member 90 such as that shown in FIG. 10 may also be used. This protective member 90 is also formed by bending a metal plate of narrow width that extends in the vertical direction, and both ends in the width direction form ribs that are folded toward the front, similar to the protective member 70 shown in FIG. 9. Also, a portion that serves as the abutting portion 73 that disperses the load and transmits it to the side surface of the inverter 20, and the fastening portion 76 that is fastened to the inverter 20 is provided on the lower end portion of the protective member 90. Further, a tapered portion 99 that tapers away from the side surface of the inverter 20 farther down is formed in substantially the center of the protective member 90. This tapered surface 99 serves as a guide portion that guides the direction of movement of the stabilizing brace 24 that is contacted by the tapered surface 99 as a result of the tapered surface 99 receiving force from the side.

In the example embodiment described above, the unfastening force of the rear end portion 42$r$ is small, but conversely, the unfastening force of the front end portion 42$f$ may be small. In this case as well, one end of the stabilizing brace 24 becomes a free end following a collision with the inverter 20, so the stabilizing brace 24 is able to move, and as a result, a place for the inverter 20 to go is able to be created. Also, in this example embodiment, making the inserting portion for the fastening bolt be the cutaway 44 enables the unfastening force to be small, but another structure may also be used as long as unfastening can be achieved by the collision force of the inverter 20. For example, a notch may be formed in the edge of a round hole into which the fastening bolt is inserted, so that the area around the round hole will break with relatively little force. Also, the inverter 20 and the stabilizing brace 24 are given as examples in the description above, but the invention may also be applied to other electronic equipment and an another vehicle body reinforcing member as long as the other electronic equipment is onboard electronic equipment and the other vehicle body reinforcing member is a vehicle body reinforcing member that is arranged around the electronic equipment and that may collide with the electronic equipment when a collision occurs.

The invention claimed is:

1. A protective device for an onboard electronic equipment, comprising:
   a vehicle body reinforcing member that is arranged around the electronic equipment, an one end and the other end of the vehicle body reinforcing member are fastened to an onboard fixed member, and in which force required to unfasten the one end is less than force required to unfasten the other end; and
   a protective member that is mounted to a facing surface of the electronic equipment that faces the vehicle body reinforcing member such that, when the electronic equipment moves to the vehicle body reinforcing member side due to receiving force from a side of a vehicle body, the protective member will contact the vehicle body reinforcing member before the electronic equipment does.

2. The protective device according to claim 1, wherein the protective member includes a guide portion that guides a direction of movement of the vehicle body reinforcing member,
   the vehicle body reinforcing member is contacted by the protective member as a result of the protective member receiving force from the side of the vehicle body and the one end has been unfastened from the fixed member following contact with the protective member.

3. The protective device according to claim 2, wherein the guide portion is a depressed portion that is provided in a position where the guide portion will contact the vehicle body reinforcing member, and that guides the vehicle body reinforcing member, such that the vehicle body reinforcing member pivots about the other end.

4. The protective device according to claim 3, further comprising:
   a stopper that limits an amount of pivot of the vehicle body reinforcing member about the other end, by abutting against the vehicle body reinforcing member that pivots about the other end.

5. The protective device according to claim 2, wherein the guide portion is an inclined surface that is provided in a position where the guide portion will contact the vehicle body reinforcing member, the guide portion guides the vehicle body reinforcing member such that the one end moves upward along the inclined surface.

6. The protective device according to claim 1, wherein the one end of the vehicle body reinforcing member has a cutaway that is open on the electronic equipment side of the one end, and the one end of the vehicle body reinforcing member is fastened to the fixed member by a fastening screw inserted into the cutaway.

7. The protective device according to claim 1, wherein the protective member is such that a portion of the protective member contacts the facing surface of the electronic equipment, and another portion of the protective member is mounted to the electronic equipment at a position away from the facing surface.

8. The protective device according to claim 7, wherein the portion of the protective member has a flat shape that is parallel to the facing surface.

9. The protective device according to claim 1, wherein the vehicle body reinforcing member is a stabilizing brace by which a suspension tower and a dash panel are connected together inside of an engine compartment.

* * * * *